April 23, 1968  A. F. KOPASKA  3,379,301
CENTER DRIVE AUGER CONVEYOR
Filed July 29, 1966
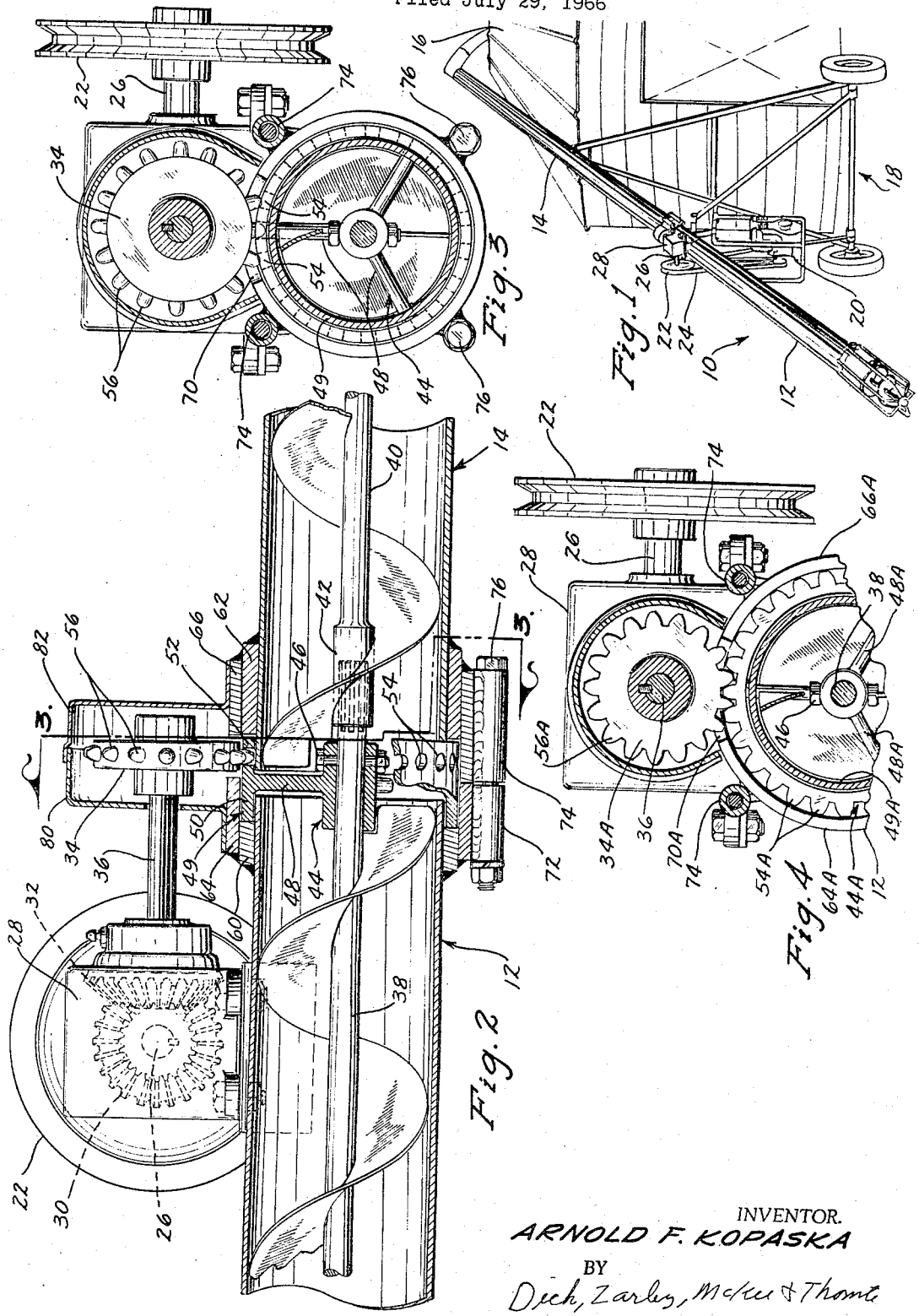
INVENTOR.
ARNOLD F. KOPASKA
BY
Dech, Zarley, McKee & Thomte
ATTORNEYS

United States Patent Office 3,379,301
Patented Apr. 23, 1968

3,379,301
CENTER DRIVE AUGER CONVEYOR
Arnold F. Kopaska, Guthrie Center, Iowa 50115
Filed July 29, 1966, Ser. No. 568,988
7 Claims. (Cl. 198—213)

ABSTRACT OF THE DISCLOSURE

A device including a pair of tube sections having an auger shaft rotatably mounted therein and a gear disposed therebetween having an annular portion disposed radially outwardly of the conveyor tubes and having an annular flange extending laterally of said tubes in mating engagement with the outer peripheral surfaces of each of said tubes, a drive wheel rotatably disposed in direct engagement with the outer peripheral surface of said gear for driving said auger shaft. The annular portion of the gear is disposed along its peripheral edges closely adjacent a pair of annular portions secured to said tubes and each having an annular member secured thereto terminating longitudinally closely adjacent each other and having an opening formed therebetween for said drive gear to engage said auger gear. A plurality of fastener units interconnect said tubes and are secured to said annular members.

---

A common problem encountered in endeavoring to drive an auger-type conveyor intermediate its ends is that the two tube sections of the auger conveyor never can be sealed satisfactorily to prevent grain leakage from between the two tube sections.

Thus, it is one of the principal objects of this invention to provide a center drive auger conveyor which will provide unobstructed flow of material through the conveyor from one tube section to the next tube section without the loss of any material through leakage.

A still further object of this invention is to provide a center drive auger conveyor having a pair of tube sections which are rigidly interconnected in the area of the center drive assembly.

Yet another related object of this invention is to provide a center drive auger conveyor which is provided with a drive means connected to the center drive shaft of the auger conveyor which occupies a minimum of space and may be located at any point along the length of the auger conveyor.

A still further object of this invention is to provide a center drive auger conveyor having an external drive shaft which extends in parallel relationship to the auger drive shaft.

A further object of this invention is to provide a center drive auger conveyor which is simple in design, economical in manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary perspective view of a center drive auger conveyor;

FIG. 2 is a fragmentary longitudinal cross-sectional view of the center drive auger conveyor;

FIG. 3 is a cross-sectional view taken along line 3—3 in FIG. 2; and

FIG. 4 is a cross-sectional fragmentary view similar to FIG. 3 but of an alternate embodiment.

The auger conveyor of this invention is referred to generally in FIG. 1 by the reference numeral 10 and includes a lower tube section 12 interconnected to an upper tube section 14. As shown, the upper section 14 is provided with a spout in communication with a grain bin 16.

The auger conveyor 10 is made portable by a wheel assembly structure 18. As seen in FIG. 1, a gasoline engine 20 is supported on the conveyor 10 and is connected to a pulley 22 through a drive belt 24. The pulley 22 is in turn connected by a shaft 26 to a gear box 28.

In FIG. 2, it is seen that the gear box 28 includes a spur gear 30 on the end of the pulley shaft 26 which drives a spur gear 32 connected to a drive wheel 34 through a drive shaft 36.

The auger sections 12 and 14 include conventional center shafts 38 and 40 interconnected by a spline connection 42.

The auger shaft 38 is provided with an auger gear 44 connected thereto by a bolt 46. A plurality of spokes 48 extend from the auger gear hub to an annular plate portion 49 which includes oppositely extending flange portions 50 and 52 in mating engagement with the outer peripheral surfaces of the auger tubes 12 and 14.

In FIG. 2, it is seen that a plurality of gear holes 54 are provided in the annular plate 49 for engagement with the plurality of pointed teeth 56 on the drive wheel sprocket 34.

It is to be particularly noted that the inner ends of the auger tube sections 12 and 14 as clearly seen in FIG. 2 terminate closely adjacent the spokes 48 of the auger gear 44 and inwardly of the outer peripheral edges of the annular flanges 50 and 52. Consequently material flowing from the auger section 12 to the auger section 14 cannot escape from between the adjacent ends of the auger sections.

A pair of annular shoulder plates 60 and 62 are provided on the auger sections 12 and 14 respectively to provide bearing surfaces for the peripheral edges of the flanges 50 and 52. Outwardly of the shoulder plates 60 and 62 a pair of annular members 64 and 66 are secured to the plates 60 and 62 respectively. It is seen that the plate 64 extends beyond the end of the auger tube 12 and over the flange portion 50 where it terminates closely adjacent the drive wheel 34. Similarly, the plate member 66 terminates closely adjacent the drive wheel 34 and thus the two plates 64 and 66 provide an additional sealing means to prevent escape of material from the auger sections 12 and 14.

It is further seen in FIG. 3 particularly that the teeth 56 on the drive wheel 34 tend to push back into the auger any grain or the like that may have entered the teeth holes 54 in the annular gear flange 49. Thus, an extra protection against leakage has been provided.

In the alternate embodiment in FIG. 4, a sprocket-type drive wheel 34A has been provided having a plurality of teeth 56A which intermesh with a plurality of sprocket teeth 54A on the auger gear 44A inside the auger section 12. The auger gear spokes 48A in a similar fashion interconnect the auger sprocket gear hub to the outer annular flange 49A which extends over the ends of the tube sections 12 and 14. It is seen in this embodiment that the holes 54 through the annular flange 49A have been eliminated and thus there is one less possible source of leakage. In both of the embodiments, it is noted that the outer annular plate members 64, 66 and 64A and 66A are in mating engagement with each other as seen at the bottom of the unit in FIG. 2 and are formed with an opening 70 and 70A as seen in FIGS. 3 and 4 respectively to accommodate the intermeshing of the drive wheel with the auger gear.

The pair of auger tube sections 12 and 14 are secured together by the provision of a plurality of sleeve elements 72 and 74 on the outer plate members 64 and 66. A bolt member 76 interconnects adjacent sleeve elements 72 and 74 to form a rigid integral unit from the two auger sections 12 and 14.

Thus it is seen that by use of either of the embodiments of this invention as shown in FIGS. 3 and 4, for example, it is possible to provide direct drive power to the auger shaft intermediate its ends and yet have a perfect seal between the adjacent interconnected auger section ends. Moreover, the interconnected auger sections 12 and 14 provide a rigid unit of greater strength at the point of interconnection.

To completely seal off the drive assembly, a pair of interconnecting housing walls 80 and 82 are provided on the annular plate members 64 and 66 respectively to enclose the drive wheel 34.

Some changes may be made in the construction and arrangement of my center drive auger conveyor without departing from the real spirit and purpose of my invention, and it is my intention to cover by my claims, any modified forms of structure or use of mechanical equivalents which may be reasonably included within their scope.

I claim:

1. A center drive auger conveyor assembly comprising a conveyor tube with an auger shaft rotatably mounted therein, a gear on said auger shaft, said gear having an annular portion disposed radially outwardly of said conveyor tube, a drive wheel rotatably disposed to rotate about an axis parallel to said shaft, and the outer peripheral surface of said drive wheel being in direct engagement with said annular portion of said gear, said annular portion of said gear having an inner peripheral surface in mating engagement with the outer peripheral surface of said tube, a second tube section is disposed on the opposite side of said gear from said first tube section, said gear has spoke means connecting said annular portion to said shaft, and said annular portion has annular flange portions extending in opposite directions from said spoke means for mating engagement with the outer peripheral surface of said first and second tube sections, and said first and second tube sections terminate closely adjacent said spoke means and longitudinally inwardly of the outer peripheral edges of said annular flange portions, said gear adjacent the inner peripheral surface of said first and second tube sections has a thickness which is less than the width of the annular space between said first and second tube sections, and an annular shoulder is fixedly provided on each of said first and second tube sections closely adjacent the adjacent outer peripheral edges of said flange portions.

2. The structure of claim 1 wherein an annular member is fixedly secured to each of said shoulders and terminate longitudinally closely adjacent each other and an opening is formed on the meeting line for a portion of said drive wheel.

3. The structure of claim 2 and a plurality of fastener units disposed around said pair of auger sections and having cooperating elements on said annular members being interlocked to hold said first and second tube sections together.

4. The structure of claim 3 wherein said gear annular portion and said drive wheel each have a plurality of cooperating teeth means around their peripheries.

5. A center drive auger conveyor assembly comprising a conveyor tube with an auger shaft rotatably mounted therein, a gear on said auger shaft, said gear having an annular portion disposed radially outwardly of said conveyor tube, a drive wheel rotatably disposed to rotate about an axis parallel to said shaft, and the outer peripheral surface of said drive wheel being in direct engagement with said annular portion of said gear, and said annular portion of said gear has an inner peripheral surface in mating engagement with the outer peripheral surface of said tube, and said teeth means on said gear annular portion periphery are uniformly spaced apart cavities and said teeth means on said drive wheel are received in said cavities.

6. The structure of claim 5 wherein said annular portion of said gear is imperforate.

7. The structure of claim 5 wherein said cavities extend radially through said annular portion and are closed by the end of the adjacent tube section.

References Cited

UNITED STATES PATENTS

| | | | |
|---|---|---|---|
| 1,032,850 | 7/1912 | Mount | 198—213 |
| 2,446,492 | 8/1948 | Scott | 198—213 X |
| 2,610,727 | 9/1952 | Beldin | 198—213 |
| 3,118,571 | 1/1964 | Reynolds | 74—415 X |

FOREIGN PATENTS

| | | |
|---|---|---|
| 569,632 | 6/1945 | Great Britain. |

EDWARD A. SPOKA, *Primary Examiner.*

EVON C. BLUNK, *Examiner.*